United States Patent [19]

Stowe

[11] 4,380,394
[45] Apr. 19, 1983

[54] FIBER OPTIC INTERFEROMETER

[75] Inventor: David W. Stowe, Buffalo Grove, Ill.

[73] Assignee: Gould Inc., Rolling Meadows, Ill.

[21] Appl. No.: 266,773

[22] Filed: May 26, 1981

[51] Int. Cl.³ ............................................. G01B 9/02
[52] U.S. Cl. .................................................. 356/358
[58] Field of Search ..................... 356/358, 4.5, 356; 350/96.15, 96.16

[56] References Cited

U.S. PATENT DOCUMENTS 4,310,905  1/1982  Palmer ............................ 350/96.15

FOREIGN PATENT DOCUMENTS 197704  4/1977  German Democratic Rep. ..................................... 356/4.5

OTHER PUBLICATIONS

Bien, F., et al., "Absolute Distance Measurements by Variable Wave Length Interferometry", Applied Optics, vol. 20, No. 3, Feb. 1, 1981, pp. 400-403.

Primary Examiner—Bruce Y. Arnold
Attorney, Agent, or Firm—Edward E. Sachs; K. H. Pierce; John R. Garrett

[57] ABSTRACT

An interferometer is disclosed for optically sensing displacements in a surface. A first fiber optic waveguide receives light from a laser in one end and transports it to the other end where a portion is back reflected and a portion is projected upon the surface. The reflected light from the surface re-enters the fiber optic at the projecting end and combines with the back reflected signal to derive an optical information wave. This optical information wave is evanescently coupled to a second fiber optic waveguide which transports this wave to a detector. A specific amount of reflective matter is attached to the end of the first fiber optic waveguide to enhance reflection therefrom, and an optical energy absorber is fixedly attached to the other end of the second fiber optic waveguide to prevent internal back reflection within the second fiber optic waveguide.

2 Claims, 4 Drawing Figures

FIBER OPTIC INTERFEROMETER

BACKGROUND OF THE INVENTION

The present invention relates to optical interferometers and is more particularly directed to an apparatus that utilizes fiber optics to direct the multiple light paths within the interferometer itself.

An interferometer is a device that utilizes light in order to make precise measurements. These measurements may include measurements from very small distances to measurements of binary star separations. Also, in interferometer can be used to determine refractive indices, measure the deformation of surfaces and measure small ultrasonic vibrations in a surface.

The prior art teaches several different configurations for interferometers. Some of the more well known configurations are the Rayleigh interferometer, the Michelson stellar interferometer, the Fabry-Perot interferometer, and the Mach-Zehnder interferometer. All of these interferometers use an air path to transmit the light from the source to the eventual interference target. Fluctuations in the ambient atmosphere due to local variations in temperature or pressure can introduce phase changes into the optical paths which are not the same for both the signal and the reference path. These fluctuations in phase introduce noise into the interferometer which limits the ultimate sensitivity of the device.

OBJECTS OF THE INVENTION

An object of the present invention is to provide an interferometer configuration that will minimize the effects due to fluctuations in the ambient atmosphere.

Another object of the present invention is to provide an interferometer that utilizes fiber optic waveguides to contain the various light beams within the interferometer.

Yet another object of the present invention is to provide a fiber optic interferometer that does not require an excessive amount of calibration and thus makes the device easier to use.

The above objects are given by way of example. Thus other desirable objectives and advantages achieved by the invention may occur to those skilled in the art. The scope of the invention is to be limited only by the appended claims.

BRIEF SUMMARY OF THE INVENTION

The above objects and other advantages are achieved by the present invention. An apparatus is provided that utilizes fiber optic waveguides to transmit and carry the internal beam within an interferometer. In one embodiment of the present invention a first fiber optic carries the source beam directly to the interference target. A second fiber optic directs the source beam to the surface to be measured. A third fiber optic receives the reflected light from the surface to be measured and carries or transports this reflected light to the interference target. The interference target will exhibit a fringe pattern which is a function of the source beam directly carried by the first fiber optic and the reflection pattern received and transported by the third fiber optic. Since all the fiber optics contained within the interferometer will be subject to the same environment, variations in the ambient atmosphere will be nullified.

In another embodiment of the present invention a reference beam is derived from back reflection at the output face of a first fiber optic waveguide. Such a reflection occurs naturally due to the difference in refractive indices between the glass and the air. The reflection is enhanced by placing a partially reflecting layer at the end of the fiber. A second light beam is obtained by reflecting the light output from the reference fiber off of the surface to be examined and then back into the fiber. These two interfering beams transfer energy to a detecting fiber optic waveguide via evanescent coupling therebetween.

DESCRIPTION OF THE PREFERRED EMBODIMENTS

Figure 1:
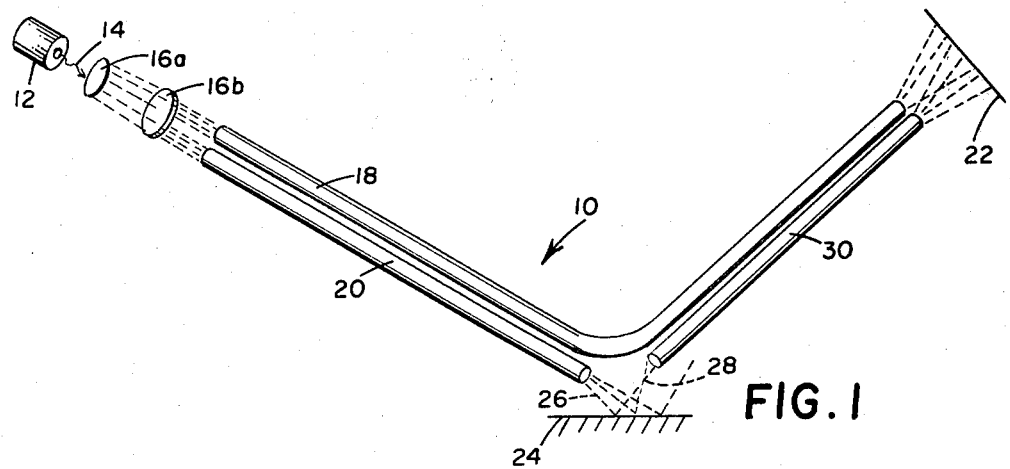
FIG. 1 is an optical diagram of one of the embodiments of the present invention.

A description of the invention follows referring to the drawings in which like reference numerals denote like elements of structure in each of the several figures. In general, the terms "optical waveguide" or "fiber optic waveguide" will be used herein to refer to a glass transmission line having a core member with cladding members concentrically surrounding the core for transmission by internal reflection at the core-clad interface of electromagnetic radiation which lies in the optical portion of the electromagnetic spectrum between microwaves and X-rays and including the ultra-violet, visible and infra-red regions.

Turning now to the figures showing the various embodiments of the present invention, FIG. 1 shows a schematic diagram of interferometer 10. A light source 12 preferably a monochromatic light source such as a laser directs a beam of light 14 toward focusing lenses 16a and 16b. The focusing lenses are used to broaden the parallel path of the light beam 14. The light is directed toward two fiber optic waveguides 18 and 20. Fiber optic waveguide 18 carries the incoming parallel light beam 14 through its core and projects the beam upon surface 22 thus defining a reference beam. Optical waveguide 20 also receives light beam 14 and carries the beam through its core and projects the beam upon a surface 24 which is to be measured. One contemplative measurement that can be made of surface 24 is surface vibrations. The projected light 26 from optical waveguide 20 strikes surface 24 and reflects off of a surface. The reflected light 28 enters optical waveguide 30. It will be appreciated by those skilled in the art that only a small amount of the reflected light 28 actually enters the optical waveguide 30. Optical waveguide 30 thus carries the reflected light 28 through its core and projects it also upon surface 22. Optical waveguides 20 and 30 are in juxtaposition with optical waveguide 18 such that the optical waveguides 20 and 30 are parallel with optical waveguide 18. The two projected beams from optical waveguide 18 and optical waveguide 30 projected upon surface 22 causes an interference pattern which will fluctuate as a function of the surface vibrations of surface 24. Since the reference beam 14 and the reflected signal from the surface to be measured 28 is carried through fiber optic waveguides, the interferometers 10 is less sensitive to ambient variations. The fluctuations due to ambient variations caused by light travelling in air paths in prior art interferometers is substantially eliminated.

Figure 2:
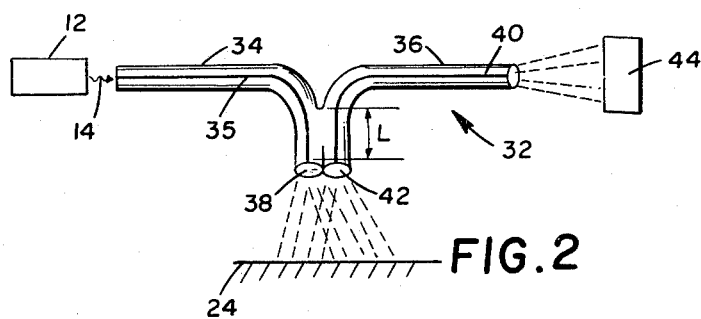
FIG. 2 is an optical diagram of another embodiment of the present invention.

FIG. 2 shows another embodiment of the present invention in which interferometer 32 has two fiber optic waveguides 34 and 36. A monochromatic light source 12 directs a beam of light 14 toward fiber optic 34. The core 35 of fiber optic 34 carries the optical energy toward end 38 of fiber optic 34. A reference beam is derived within fiber optic waveguide 34 by back reflection at surface 38 of fiber optic 34. Such reflection occurs naturally due to the difference in the refractive index between the glass core and the air. Back reflection can be enhanced by placing a partially refecting layer at the end 38 of fiber optic waveguide 34. Fiber optic waveguide 36 is connected to fiber optic waveguide 34 over a finite length L such that evanescent wave coupling occurs between core 35 of fiber optic 34 and core 40 of fiber optic 36 over this finite length L. A finite amount of optical energy will pass through surface 38 of fiber optic 34 and through surface 42 of fiber optic 36 and will project upon surface 24 to be measured. A quantitative amount of light reflected off a surface 24 will again enter fiber optic 34 and 36 at surface 38 and 42 respectively. This reflected light will combine with the initial reference back reflection beam discussed supra. This combined signal which is due to the back reflection which is evanescently coupled to the fiber optic core 40 within fiber optic waveguide 36 and the reflected signal from surface 24 will be carried along fiber optic 40 and will be received by an analyzing device 44. The optical energy received by 44 will vary in intensity as a function of the surface vibrations of surface 24. Fiber optic 36 defines the detecting leg of the interferometer 32. This embodiment of the present invention is also substantially insensitive to the ambient environment fluctuations since the reference signal and the reflected light travel through the same fiber optic waveguide. Also the evanescent wave coupling action between the two fibers also eliminates phase noise caused by motion sensitivity between the light paths. Critical alignment of the interferometer itself is also eliminated.

Figure 3:
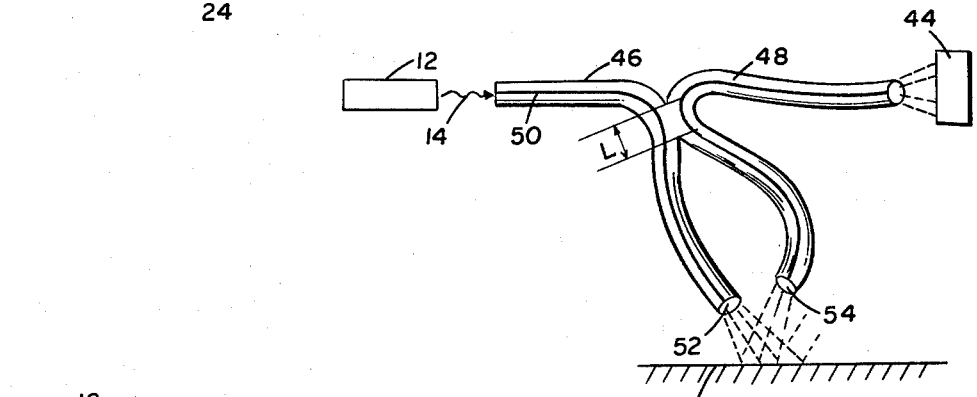
FIG. 3 is an optical diagram of another embodiment of the present invention.

FIG. 3 shows another embodiment of the present invention which again has two fiber optic waveguides 46 and 48. The monochromatic light source 12 projects a light beam 14 to fiber optic waveguide 46. Core 50 and fiber optic 46 carries the optical energy to end surface 52 of fiber optic waveguide 46. Fiber optic waveguie 46 and fiber optic waveguide 48 are in juxtaposition such that evanescent wave coupling occurs over a distance L which is not near the ends of the fiber optic waveguides. This leaves the fiber optic waveguide end 52 of fiber optic waveguide 46 and fiber optic waveguide end 54 of fiber optic waveguide 48 free to vary their respective orientations above surface 24 to be measured. This will enhance the amount of light that will be received by reflection off of surface 24. The combination of the reference signal due to back reflection and the detection signal which is reflected off of surface 24 works in a similar manner as is described with respect to the embodiment shown in FIG. 2.

Figure 4:
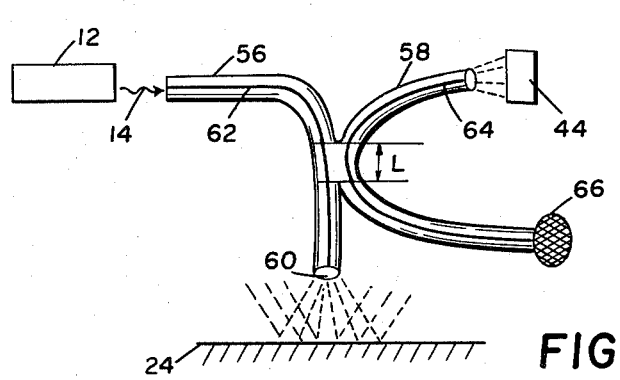
FIG. 4 is an optical diagram of yet another embodiment of the present invention.

FIG. 4 shows yet another embodiment of the present invention in which there are two fiber optic waveguides 56 and 58. The monochromatic light source 12 projects a light beam 14 toward fiber optic waveguide 56. Fiber optic waveguide 56 and fiber optic waveguide 58 are in juxtaposition so as to have evanescent coupling over a finite length L. In this configuration, the light emerges from surface 60 of fiber optic waveguide 56 and is received back only through fiber optic waveguide 56. Therefore the signal travelling back up through core 62 of fiber optic waveguide 56 carries the combined signal of both the back reflection signal off of surface 60 and the reflected signal off of surface 24. This combined signal is then evanescently wave coupled to core 64 of fiber optic 58. An absorber 66 is placed at one end of fiber optic 58 in order to eliminate end reflections in the fiber optic 58. The combined signal is again projected from fiber optic waveguide 58 to a detection or analyzing device 44. This type of configuration is used when the amount of reflected light off of surface 24 is of sufficient intensity to provide sufficient measurement information.

The present invention has proved to have sufficient sensitivity as to observe displacements of $5 \times 10^{-7}$ centimeters with no spectral analysis or narrow band filtering. Displacements of the order of $10^{-9}$ centimeters could be easily detected by using spectral analysis.

This invention has been described with reference to preferred embodiments. Obvious modifications and alterations will occur to others upon reading and understanding the specification. The intent is to include all such modifications and alterations insofar as they come within the scope of the appended claims or the equivalent thereof.

What is claimed is:

1. An inteferometer for measuring displacements of a surface to be measured, said interferometer comprising:
   an optical energy source;
   a first fiber optic waveguide having a finite length with a first end and a second end, light from said optical energy source entering said first end of said first fiber optic waveguide and being transported to said second end of said first fiber optic waveguide, said second end internally reflecting at least a portion of the light back towards said first end of said first fiber optic and projecting the remainder of said light; and
   a second fiber optic waveguide having a finite length with a first end and a second end;
   said first and said second fiber optic waveguide being in juxtaposition such that evanescent wave coupling occurs between their respective cores over a predetermined length;
   said second end of said first fiber optic being in such spatial relationship with said surface to be measured that said projected light strikes said surface and reflects therefrom with at least a portion of said reflected light from said surface entering said second end of said first fiber optic and combining with said internally reflected light within said first fiber optic waveguide thus defining an optical information wave, said optical information wave being evanescently coupled to said second fiber optic waveguide such that said optical information wave is transported to said second end of said second fiber optic waveguide, and
   an optical energy absorber fixedly attached to said first end of said second fiber optic waveguide to prevent internal back reflection within said second fiber optic waveguide.

2. An interferometer for measuring displacements of a surface to be measured, said interferometer comprising:
   an optical energy source;

a first fiber optic waveguide having a finite length with a first end and a second end, light from said optical energy source entering said first end of said first fiber optic waveguide and being transported to said second end of said first fiber optic waveguide, said second end internally reflecting at least a portion of the light back towards said first end of said first fiber optic and projecting the remainder of said light, said second end of said first fiber optic waveguide having a specific amount of reflective matter attached thereto in order to enhance the degree of the internal reflection; and a second fiber optic waveguide having a finite length with a first end and a second end;

said first and said second fiber optic waveguide being in juxtaposition such that evanescent wave coupling occurs between their respective cores over a predetermined length;

said second end of said first fiber optic being in such spatial relationship with said surface to be measured that said projected light strikes said surface and reflects therefrom with at least a portion of said reflected light from said surface entering said second end of said first fiber optic and combining with said internally reflected light within said first fiber optic waveguide thus defining an optical information wave, said optical information wave being evanescently coupled to said second fiber optic waveguide such that said optical information wave is transported to said second end of said second fiber optic waveguide.

* * * * *

UNITED STATES PATENT AND TRADEMARK OFFICE
CERTIFICATE OF CORRECTION

PATENT NO. : 4,380,394
DATED : April 19, 1983
INVENTOR(S) : David W. Stowe

It is certified that error appears in the above-identified patent and that said Letters Patent are hereby corrected as shown below:

In the BRIEF SUMMARY OF THE INVENTION, column 1, line 52, please delete "beam" and insert therefore -- beams --.

In the DESCRIPTION OF THE PREFERRED EMBODIMENTS, FIG. 3, column 3, line 49, please delete "waveguie" and insert therefor -- waveguide --.

In Claim 1, column 4, line 30, please delete "inteferometer" and insert therefor -- interferometer --. Column 4, line 51, after "therefrom" please delete " with" and add -- , --.

In Claim 2, column 6, line 6, after "therefrom" please delete " with" and add -- , --.

Signed and Sealed this

Eighth Day of November 1983

[SEAL]

Attest:

GERALD J. MOSSINGHOFF

*Attesting Officer*  *Commissioner of Patents and Trademarks*